United States Patent
Shirai et al.

(10) Patent No.: US 9,253,751 B2
(45) Date of Patent: Feb. 2, 2016

(54) METHOD OF CALCULATING MOVEMENT SPEED AND DEVICE FOR CALCULATING MOVEMENT SPEED

(71) Applicant: Seiko Epson Corporation, Tokyo (JP)

(72) Inventors: Tsubasa Shirai, Shiojiri (JP); Yoshitaka Yamagata, Matsumoto (JP)

(73) Assignee: Seiko Epson, Corporation, Tokyo (JP)

( * ) Notice: Subject to any disclaimer, the term of this patent is extended or adjusted under 35 U.S.C. 154(b) by 186 days.

(21) Appl. No.: 13/758,899

(22) Filed: Feb. 4, 2013

(65) Prior Publication Data
US 2013/0210453 A1 Aug. 15, 2013

(30) Foreign Application Priority Data
Feb. 6, 2012 (JP) .................................. 2012-023153

(51) Int. Cl.
| | |
|---|---|
| H04W 24/00 | (2009.01) |
| H04W 64/00 | (2009.01) |
| G01S 19/52 | (2010.01) |
| G01S 11/10 | (2006.01) |

(52) U.S. Cl.
CPC ............. *H04W 64/006* (2013.01); *G01S 11/10* (2013.01); *G01S 19/52* (2013.01)

(58) Field of Classification Search
CPC ................................ H04B 1/709; G01S 19/22
USPC ........................................................ 375/150
See application file for complete search history.

(56) References Cited

U.S. PATENT DOCUMENTS

| | | | | |
|---|---|---|---|---|
| 6,693,592 B2* | 2/2004 | Dowdle | ..................... | G01S 5/02 |
| | | | | 342/357.3 |
| 8,044,851 B2* | 10/2011 | Kholostov | .............. | G01S 19/22 |
| | | | | 342/357.61 |
| 2001/0015988 A1* | 8/2001 | Sawada et al. | ................ | 370/512 |
| 2004/0008139 A1* | 1/2004 | Stone | ...................... | G01S 11/10 |
| | | | | 342/451 |
| 2009/0103645 A1* | 4/2009 | Jitsukawa et al. | ............. | 375/260 |
| 2009/0141779 A1* | 6/2009 | Murakami | ..................... | 375/150 |
| 2010/0194633 A1 | 8/2010 | Yamagata | | |
| 2011/0102252 A1* | 5/2011 | Watanabe et al. | ........ | 342/357.24 |

FOREIGN PATENT DOCUMENTS

| | | |
|---|---|---|
| JP | 09-304515 A | 11/1997 |
| JP | 2010-175426 A | 8/2010 |

OTHER PUBLICATIONS

Petovello, M., et al. "High sensitivity GPS velocity updates for personal indoor navigation using inertial navigation systems." Institute of Navigation GPS Conference. 2003.

\* cited by examiner

*Primary Examiner* — Vladimir Magloire
*Assistant Examiner* — Shantell L Heiber
(74) *Attorney, Agent, or Firm* — Kilpatrick Townsend & Stockton LLP

(57) ABSTRACT

In a baseband processing circuit unit, a reception signal type determination unit determines whether or not a reception signal in a GPS reception unit is an indirect wave. A movement speed calculation unit calculates a movement speed of the GPS reception unit using a correction coefficient of a relative speed determined in accordance with the determination of whether or not the reception signal is an indirect wave, a transmission frequency of a GPS satellite signal and a reception frequency in the GPS reception unit.

10 Claims, 8 Drawing Sheets

METHOD OF CALCULATING MOVEMENT SPEED AND DEVICE FOR CALCULATING MOVEMENT SPEED

This application claims priority to Japanese Patent Application No. 2012-023153, filed Feb. 6, 2012, the entirety of which is hereby incorporated by reference.

BACKGROUND

1. Technical Field

The present invention relates to a method of calculating a movement speed of a receiver, or the like.

2. Related Art

As a positioning system using positioning satellite signals, a GPS (Global Positioning System) is widely known, and is used in a GPS receiver which is embedded in a mobile phone, a car navigation device, or the like. In the GPS, position calculation using information, such as the positions of a plurality of GPS satellites or a pseudo distance to each GPS satellite is performed to obtain the position of the GPS receiver or a clock bias.

In the GPS, under the principle that the reception frequency changes depending on the relative speed of the GPS satellite and the GPS receiver, the movement speed of the GPS receiver can be calculated using the transmission frequency of the GPS satellite signal and the reception frequency in the GPS receiver (for example, JP-A-2010-175426).

As described above, in the GPS, the movement speed of the GPS receiver can be calculated. On the other hand, if the movement speed calculated under the above principle is temporally integrated to calculate the movement distance of the GPS receiver, an experiment has shown that the calculated movement distance tends to become shorter than the actual movement distance of the GPS receiver.

If the movement speed can be correctly calculated, the movement distance of the GPS receiver will be correctly obtained. Nevertheless, in the method of the related art, the condition that the movement distance is not correctly obtained means that the movement speed is not correctly calculated due to any number of factors.

SUMMARY

An advantage of some aspects of the invention is that it provides a new method of correctly calculating a movement speed of a receiver.

A first aspect of the invention is directed to a method for calculating a movement speed of a receiver receiving a transmission signal from a predetermined transmission source. The method includes determining whether or not a reception signal of the receiver is an indirect wave, and based on a principle that a reception frequency changes depending on a relative speed of the transmission source and the receiver, calculating the movement speed of the receiver using a correction coefficient of the relative speed determined in accordance with the determination of whether or not the reception signal is an indirect wave, a transmission frequency of the transmission signal and the reception frequency in the receiver.

As another aspect of the invention, the device for calculating a movement speed may be configured as a device including a reception unit which receives a transmission signal from a predetermined transmission source, a determination unit which determines whether or not a reception signal of the reception unit is an indirect wave, and a calculation unit which, based on a principle that a reception frequency changes depending on a relative speed of the transmission source and the reception unit, calculates the movement speed of the reception unit using a correction coefficient of the relative speed determined in accordance with the determination of whether or not the reception signal is an indirect wave, a transmission frequency of the transmission signal and the reception frequency in the reception unit.

According to the first aspect and the like, it is determined whether or not the reception signal of the receiver is an indirect wave. Based on the principle that the reception frequency changes depending on the relative speed of the transmission source and the receiver, the movement speed of the receiver is calculated using the correction coefficient of the relative speed determined in accordance with the determination of whether or not the reception signal is an indirect wave, the transmission frequency of the transmission signal and the reception frequency in the receiver.

The predetermined transmission source is a transmission source of a predetermined transmission signal, such as a positioning satellite, a pseudo satellite (pseudolite), or a base station of a mobile phone. While the details will be described in connection with an embodiment, when a signal when receiving a transmission signal from the predetermined transmission source is an indirect wave, a correction coefficient for indirect wave reception is applied as the correction coefficient of the relative speed of the transmission source and the receiver, and based on the principle that the reception frequency changes depending on the relative speed, the movement speed of the receiver can be correctly calculated.

As a second aspect of the invention, the method of calculating a movement speed according to the first aspect of the invention may be configured such that the calculating of the movement speed includes estimating an error with respect to the relative speed when it is determined that the reception signal is a direct wave.

While the calculation of the movement speed of the receiver directly using the relative speed of the transmission source and the receiver is correct if the reception signal is a direct wave, when the reception signal is an indirect wave, it cannot be considered that the calculation is correct. Accordingly, with the above configuration, an error with respect to the relative speed when the reception signal is a direct wave is estimated. With the use of the estimated error, the movement speed when the reception signal is an indirect wave can be correctly calculated.

A third aspect of the invention is directed to the method of calculating a movement speed according to the second aspect of the invention, wherein the estimating of the error includes estimating the error assuming that the movement speed of the receiver and the error have a positive correlation.

As a fourth aspect of the invention, the method of calculating a movement speed according to the third aspect of the invention may be configured such that the estimating of the error includes estimating the error based on the positive correlation in which the degree of increase of the error with respect to the movement speed of the receiver is equal to or greater than 1.0 and equal to or smaller than 3.0.

An experiment has shown that the movement speed of the receiver and the error have a positive correlation. In this case, it has been shown that, if the degree of increase of the error with respect to the movement speed of the receiver is equal to or greater than 1.0 and equal to or smaller than 3.0, the error can be effectively estimated. Therefore, according to the third or fourth aspect of the invention, it becomes possible to appropriately estimate the error.

As a fifth aspect of the invention, the method of calculating a movement speed according to any of the first to fourth aspects of the invention may be configured such that the correction coefficient is a coefficient which indicates changing a relative movement direction of the transmission source and the receiver to a given direction.

According to the fifth aspect of the invention, since the correction coefficient is a coefficient which indicates changing the relative movement direction of the transmission source and the receiver to a given direction, it is possible to appropriately obtain the relative speed when the reception signal is an indirect wave, and to prevent an erroneous movement speed from being calculated.

As a sixth aspect of the invention, the method of calculating a movement speed according to any of the first to fifth aspects of the invention may be configured such that the method further includes receiving transmission signals from a plurality of transmission sources, the determining includes determining whether or not each reception signal is an indirect wave, and the calculating of the movement speed includes calculating the movement speed of the receiver using a correction coefficient of a relative speed concerning each reception signal.

According to the sixth aspect of the invention, the movement speed of the receiver is calculated using the correction coefficient of the relative speed concerning each reception signal depending on whether or not the transmission signal received from each of a plurality of transmission sources is an indirect wave, thereby improving accuracy of movement speed calculation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
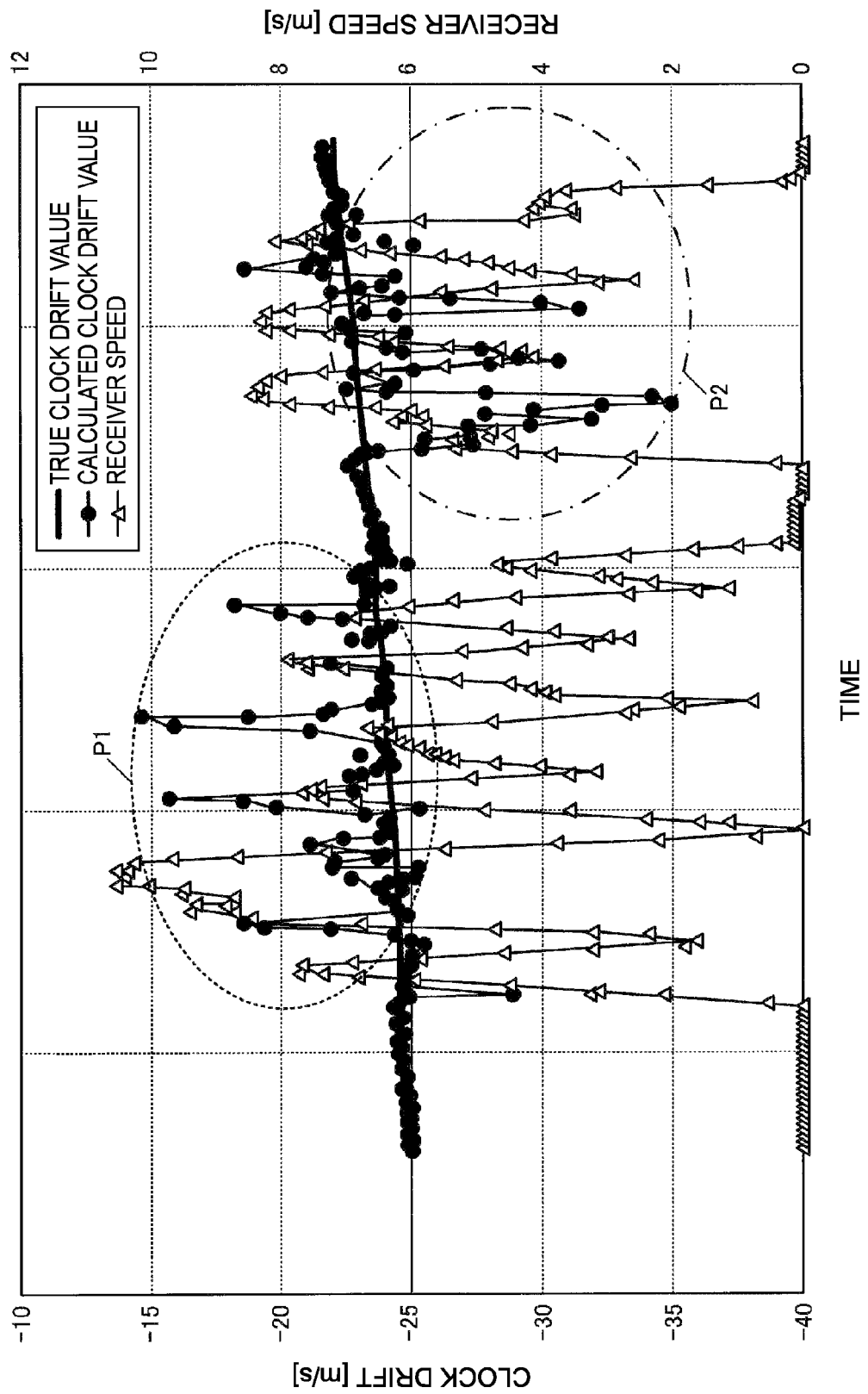
FIG. 1 shows an example of an experimental result when examining fluctuation in a drift component included in a reception frequency.

Hereinafter, a preferred embodiment to which the invention is applied will be described with reference to the drawings. This embodiment is an embodiment in which a GPS (Global Positioning System) as a type of satellite positioning system is applied. Of course, the form to which the invention can be applied is not limited to the following embodiment.

1. Principle

In a satellite positioning system using a GPS, a GPS satellite as a type of positioning satellite transmits navigation data including satellite orbit data, such as ephemeris or almanac, along with a GPS satellite signal as a type of positioning satellite signal. In this embodiment, the GPS satellite corresponds to a predetermined transmission source.

The GPS satellite signal which is the transmission signal of the GPS satellite is a signal with 1.57542 [GHz] modulated by a CDMA (Code Division Multiple Access) system, which is known as a spread spectrum system, using a C/A (Coarse and Acquisition) code as a type of spread code. 1.57542 [GHz] corresponds to the transmission frequency of the GPS satellite signal. The C/A code is a pseudo random noise code in a repetition period of 1 ms with a code length 1023 chip as 1 PN frame, and is specific to each GPS satellite.

As described in the related art, in the GPS, under the principle that the reception frequency changes depending on the relative speed of a GPS satellite and a GPS receiver, the movement speed of the GPS receiver can be calculated using a transmission frequency of the GPS satellite signal and a reception frequency in the GPS receiver. Meanwhile, an experiment has been conducted such that the movement distance and the movement direction of the GPS receiver are calculated by temporally integrating the movement speed calculated under the above principle, and displacement for the movement distance is applied to the movement direction from the latest position to calculate the position. As a result, it has been shown that the calculated position tends to draw a locus which appears to be reduced compared to locus drawn by the true position of the GPS receiver.

In order to clarify the reason for such a phenomenon, the inventors have conducted an experiment to examine the reception frequency in the GPS receiver in detail. Specifically, the GPS receiver has been provided in an automobile, a driving test in which the automobile is driven while changing the movement speed has been conducted, and in this case, fluctuation in a drift component included in the reception frequency in the GPS receiver has been examined.

A reception frequency $f_r$ in the GPS receiver can be expressed using a carrier frequency $f_c$ as a transmission frequency of the GPS satellite signal, a Doppler frequency $f_{dop}$, and a clock drift d as Expression (1).

$$f_r = f_c + f_{dop} + d \quad (1)$$

In the experiment, the reception frequency $f_r$ when GPS satellite signals have been received from a plurality of GPS satellites has been measured. The speed of the automobile has been measured using a high-precision speed measurement device to obtain the speed of the GPS receiver (hereinafter, referred to as "receiver speed"), and Doppler frequency $f_{dop}$ has been calculated using the receiver speed and the speed (hereinafter, referred to as "satellite speed") of the GPS satellite. The clock drift d has been measured using these values from Expression (1) (hereinafter, referred to as "calculated clock drift value"), and time-series change in drift component included in the reception frequency has been examined.

FIG. 1 shows an experiment result focusing on one GPS satellite from among a plurality of GPS satellites. In FIG. 1, the horizontal axis is a time axis. The calculated clock drift value is represented by a plot of black dots, and the receiver speed is represented by a plot of white triangles. The true value (hereinafter, referred to as "true clock drift value") of the clock drift d is represented by a bold solid line in the drawing.

In detail, the value of the clock drift (in FIG. 1, the clock drift at points (three locations) where the receiver speed becomes zero) when the GPS receiver is stopped is obtained using the position and speed when the GPS receiver is stopped, and a line obtained by subtracting an approximation line from these values corresponds to a bold solid line of FIG. 1 which indicates the true clock drift value. Meanwhile, the clock drift represents the result of conversion in a unit "m/s" of speed.

From the experiment result, it is understood that the calculated clock drift value swings significantly upward and downward with respect to the true clock drift value. Ideally, while the calculated clock drift value changes so as to follow the true clock drift value, actually, deviation occurs between the calculated clock drift value and the true clock drift value.

When focusing on the deviation between the calculated clock drift value and the true clock drift value, in a portion P1 surrounded by a dotted line, the calculated clock drift value swings upward with respect to the true clock drift value, and the amount of deviation is represented to be positive. In a portion P2 surrounded by a one-dot-chain line, the calculated clock drift value swings downward with respect to the true clock drift value, and the amount of deviation is represented to be negative.

Accordingly, as a result of examining the time zones corresponding to the portion P1 and the portion P2, it has been understood that the GPS receiver (automobile) has moved in a direction close to the GPS satellite in the time zone corresponding to the portion P1, and the GPS receiver has moved in a direction away from the GPS satellite in the time zone corresponding to the portion P2. Although FIG. 1 shows only the experiment result concerning one GPS satellite, it has been confirmed that the same experiment result has been obtained for other GPS satellites.

From the above experiment result, it has been understood that deviation has occurred between the calculated clock drift value and the true clock drift value, and the deviation has changed in the positive and negative directions depending on the relative movement direction of the GPS receiver with respect to the GPS satellite. The inventors have considered whether the amount of deviation represents an error (hereinafter, referred to as "Doppler error") in the Doppler frequency and have verified the Doppler error.

1-1. Verification of Doppler Error

Initially, variables are defined. The speed has a direction in addition to magnitude. For this reason, in the following description, in principle, the term "speed" represents the magnitude (scalar quantity) of speed, and the term "speed vector" represents a direction in addition to the magnitude (scalar quantity) of speed. That is, the term "speed" means "Speed", and the term "speed vector" means "Velocity".

The speed vector (hereinafter, referred to as "receiver speed vector") of the GPS receiver in the ECEF coordinate system is defined as Expression (2) using vector notation "$v_r$". The position (hereinafter, referred to as "receiver position") of the GPS receiver in the ECEF coordinate system is defined as Expression (3) using vector notation "$p_r$".

$$\vec{v}_r = \begin{bmatrix} u_r \\ v_r \\ w_r \end{bmatrix} \quad (2)$$

$$\vec{p}_r = \begin{bmatrix} x_r \\ y_r \\ z_r \end{bmatrix} \quad (3)$$

Meanwhile, the subscript "r" represents the GPS receiver. ($u_r, v_r, w_r$) represents the speed components of the X axis, the Y axis, and the Z axis of the ECEF coordinate system, and ($x_r, y_r, z_r$) represents the position components of the X axis, the Y axis, and the Z axis of the ECEF coordinate system.

The speed vector (hereinafter, referred to as "satellite speed vector") of the GPS satellite in the ECEF coordinate system is defined as Expression (4) using vector notation "$v_j$". The position (hereinafter, referred to as "satellite position") of the GPS satellite in the ECEF coordinate system is defined as Expression (5) using vector notation "$p_j$".

$$\vec{v}_j = \begin{bmatrix} u_j \\ v_j \\ w_j \end{bmatrix} \quad (4)$$

$$\vec{p}_j = \begin{bmatrix} x_j \\ y_j \\ z_j \end{bmatrix} \quad (5)$$

Meanwhile, the subscript "j" represents the number of the GPS satellite. When the number of captured GPS satellites is N, "j=1, 2, . . . , and N". ($u_j, v_j, w_j$) represents the speed components of the X axis, the Y axis, and the Z axis of the ECEF coordinate system, and ($x_j, y_j, z_j$) represents the position components of the X axis, the Y axis, and the Z axis of the ECEF coordinate system.

At this time, a unit vector (hereinafter, referred to as "line-of-sight unit vector") $l_j$ in a line-of-sight direction from the GPS receiver toward the GPS satellite can be defined as Expression (6).

$$\vec{l}_j = \frac{\vec{p}_j - \vec{p}_r}{|\vec{p}_j - \vec{p}_r|} \quad (6)$$

The receiver speed vector $v_r$ is projected in the line-of-sight direction, thereby defining the speed (hereinafter, referred to as "line-of-sight receiver speed") of the GPS receiver with respect to the line-of-sight direction. Specifically, the inner product of the receiver speed vector $v_r$ and the line-of-sight unit vector $l_j$ is calculated, thereby obtaining the line-of-sight receiver speed $v_{rad}$ as Expression (7).

$$v_{rad} = \vec{v}_r^T \cdot \vec{l}_j \quad (7)$$

Meanwhile, the superscript "T" represents the transposition of a matrix.

Figure 2:
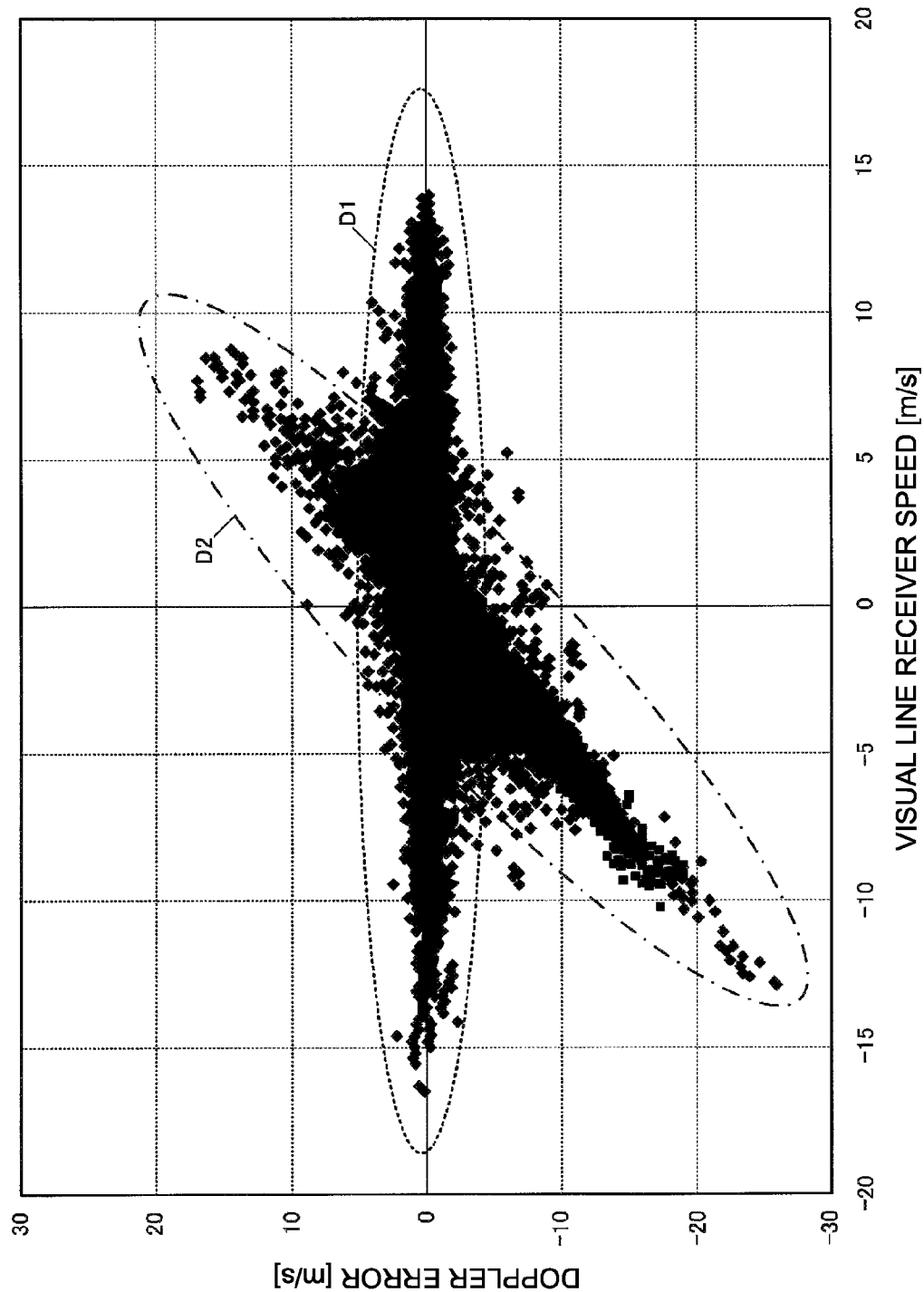
FIG. 2 shows an example of an experimental result when examining a correlation between line-of-sight receiver speed and Doppler error.

FIG. 2 is an example of an experiment result when an experiment has been conducted to examine the correlation between the line-of-sight receiver speed and the Doppler error. In this experiment, a driving test in which an automobile provided with a GPS receiver has been driven in an urban canyon environment with many skyscrapers has been conducted, and the line-of-sight receiver speed and the Doppler error have been examined. The Doppler error has been measured by obtaining the difference between the calculated clock drift value and the true clock drift value. The line-of-sight receiver speed and the Doppler error are measured once a second, and the result of plotting the characteristic values (coordinate values) of the line-of-sight receiver speed and the Doppler error for a predetermined time on the coordinate is shown in FIG. 2.

In FIG. 2, the horizontal axis represents the line-of-sight receiver speed, and the vertical axis represents the Doppler error. The units are "m/s". The right half plot of the graph is a plot indicating a situation in which the line-of-sight receiver speed has a positive value, that is, a situation in which the GPS receiver is moving in a direction close to the GPS satellite. The left half plot of the graph is a plot indicating a situation in which the line-of-sight receiver speed has a negative value, that is, a situation in which the GPS receiver is moving in a direction away from the GPS satellite.

From this graph, it is understood that the Doppler error has two types of distributions of a first distribution D1 and a second distribution D2. The first distribution D1 can be regarded as a normal distribution where the Doppler error is roughly zero. The second distribution D2 is a distribution where the line-of-sight receiver speed and the Doppler error have a positive correlation, specifically, a distribution which linearly changes depending on the line-of-sight receiver speed. The same experiment has been conducted in other cities, and it has been confirmed that the same result as in FIG. 2 has been obtained.

Since the experiment environment is the urban canyon environment, it can be inferred that the first distribution D1 represents a distribution when the GPS receiver receives a direct wave from the GPS satellite, and the second distribution D2 represents a distribution when the GPS receiver receives an indirect wave from the GPS satellite.

Figure 3A:
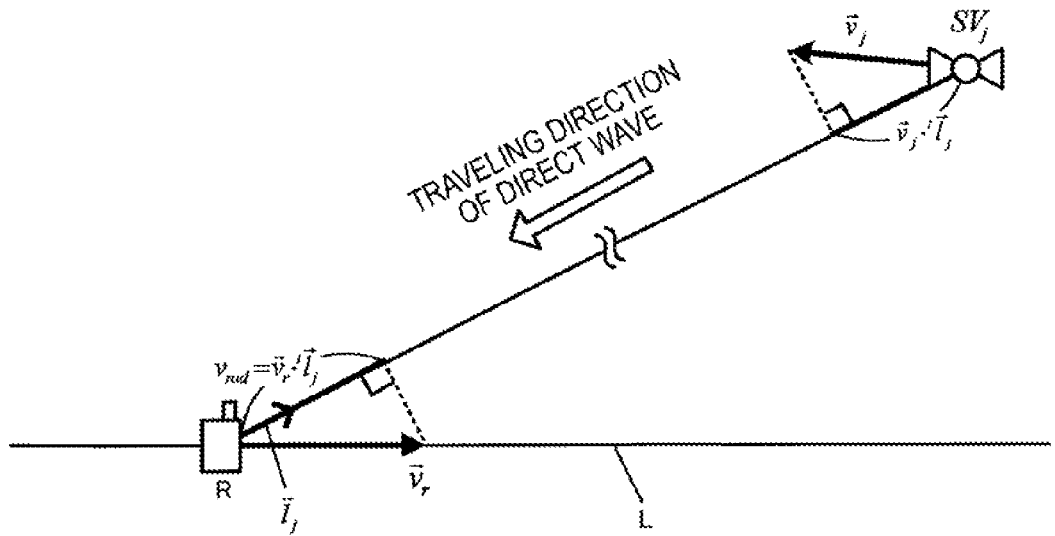
FIG. 3A is an explanatory view when a direct wave is received.
Figure 3B:
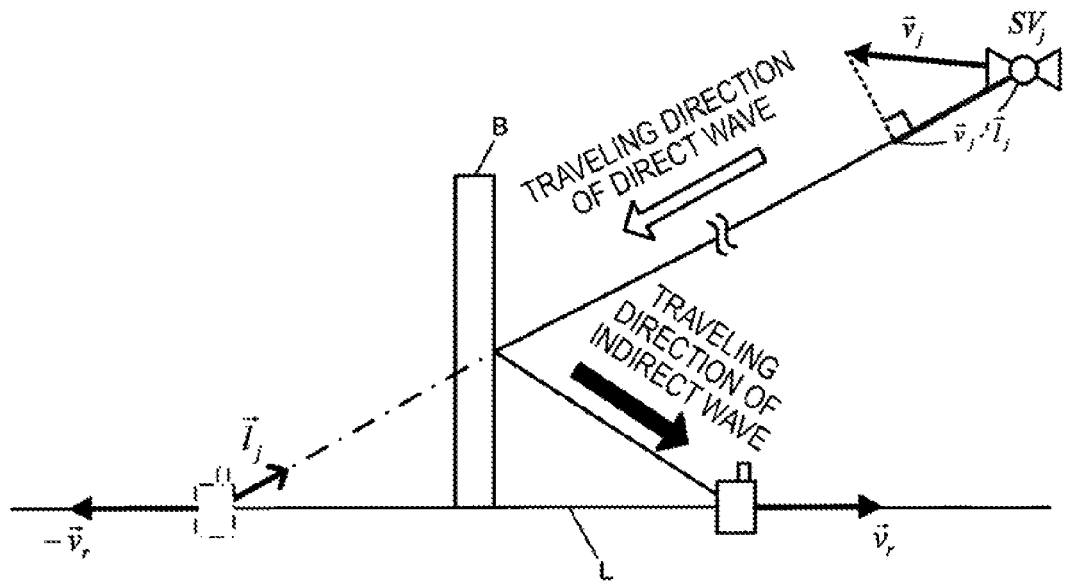
FIG. 3B is an explanatory view when an indirect wave is received.

FIGS. 3A and 3B are explanatory views when the GPS receiver receives a direct wave and an indirect wave. FIG. 3 shows a case where a GPS satellite $SV_j$ is at a predetermined position in the sky in the right direction toward paper, and the GPS receiver R moves in the right direction of the drawing. Description will be provided assuming that the sign of the receiver speed vector $v_r$ in the right direction is "positive", and the sign of the receiver speed vector $v_r$ in the left direction is "negative".

FIG. 3A is an explanatory view when the GPS receiver R receives a direct wave from the GPS satellite $SV_j$. When the GPS receiver R receives a direct wave, Doppler of the GPS receiver R occurs in a direction facing the traveling direction of the direct wave. The Doppler frequency in this case can be obtained by projecting a relative speed vector $v_j - v_r$ of the satellite speed vector $v_j$ and the receiver speed vector $v_r$ in the line-of-sight direction. In this case, the reception frequency $f_r$ in the GPS receiver R is expressed as Expression (8).

$$f_r = f_c + (\vec{v}_j - \vec{v}_r)^T \cdot \vec{l}_j + d \tag{8}$$

FIG. 3B is an explanatory view when the GPS receiver R receives an indirect wave from the GPS satellite $SV_j$. A direct wave sent from the GPS satellite $SV_j$ is reflected by an obstacle B, such as a building, and the reflected wave becomes an indirect wave and reaches the GPS receiver R. In FIG. 3B, it looks like that the GPS receiver R receives an indirect wave in a direction opposite to the movement direction.

As indicated by a one-dot-chain line in FIG. 3B, this situation is equivalent to a situation in which the GPS receiver R is virtually at a position line-symmetrical to the obstacle B on a line L, moves in the negative direction, and receives a direct wave with no obstacle B. The receive speed vector of the virtual GPS receiver R is represented by $-v_r$. For this reason, the reception frequency $f_r$ in the GPS receiver can be expressed as Expression (9).

$$f_r = f_c + (\vec{v}_j - (-\vec{v}_r))^T \cdot \vec{l}_j + d \tag{9}$$

Although in FIG. 3B, for simplification of description, a case where the positional relationship between the GPS satellite $SV_j$ and the GPS receiver R is a two-dimensional positional relationship has been described, the same can be applied to the three-dimensional positional relationship, and the reception frequency $f_r$ in the GPS receiver is expressed as Expression (9).

According to Expressions (8) and (9), the reception frequency is represented by different expressions between when the GPS receiver receives a direct wave and when the GPS receiver receives an indirect wave. This can be explained considering that an error occurs in the reception frequency $f_r$ expressed by Expression (1).

The error is represented by "$\epsilon$" as the above-described Doppler error. In this case, if the reception frequency $f_r$ is formulated taking into consideration the Doppler error $\epsilon$, Expression (10) is obtained.

$$f_r = f_c + f_{dop} + d + \epsilon \tag{10}$$

The Doppler frequency $f_{dop}$ of Expression (10) is expressed by Expression (11).

$$f_{dop} = (\vec{v}_j - \vec{v}_r)^T \cdot \vec{l}_j \tag{11}$$

From the experiment result of FIG. 2, the second distribution D2 of the Doppler error shows a linear correlation characteristic with respect to the line-of-sight receiver speed $v_{rad}$. For this reason, if the Doppler error $\epsilon$ is approximated by a linear expression using a linear function (simple increasing function) with the line-of-sight receiver speed $v_{rad}$ as a variable, Expression (12) is obtained.

$$\epsilon = \alpha v_{rad} = \alpha (\vec{v}_r^T \cdot \vec{l}_j) \tag{12}$$

Meanwhile, "$\alpha$" is a coefficient which represents the slope of the linear function.

Expression (10) can be modified as Expression (13) using Expressions (11) and (12).

$$\begin{aligned} f_r &= f_c + (\vec{v}_j - \vec{v}_r)^T \cdot \vec{l}_j + d + \alpha(\vec{v}_r^T \cdot \vec{l}_j) \\ &= f_c + (\vec{v}_j - (1-\alpha)\vec{v}_r)^T \cdot \vec{l}_j + d \end{aligned} \tag{13}$$

The first distribution D1 of the Doppler error $\epsilon$ is a normal distribution where an expected value is roughly zero. Accordingly, if $\alpha$ is zero ($\alpha=0$), Expression (13) coincides with Expression (8). Therefore, it can be said that the first distribution D1 represents a distribution when the GPS receiver receives a direct wave.

According to the experiment result of FIG. 2, in the second distribution D2 of the Doppler error $\epsilon$, the slop (the degree of increase) when the relationship between the line-of-sight receiver speed $v_{rad}$ and the Doppler error $\epsilon$ is expressed by a linear expression is approximately 2.0. Accordingly, if $\alpha$ is 2.0 ($\alpha=2.0$), Expression (13) coincides with Expression (9). Therefore, it can be said that the second distribution D2 represents a distribution when the GPS receiver receives an indirect wave.

While the relationship between the line-of-sight receiver speed $v_{rad}$ and the Doppler error $\epsilon$ is approximated by a linear expression, this is just an example. The relationship may be of course represented by a different function insofar as the function has a positive correlation.

1-2. Method of Calculating Movement Speed

Next, a method of calculating a movement speed in this embodiment will be described. This embodiment is an embodiment in which it is assumed that the speed of the GPS receiver being moved, that is, the movement speed of the GPS receiver is calculated.

Specifically, it is determined whether or not the reception signal of the GPS receiver is an indirect wave. Under the principle that the reception frequency changes depending on the relative speed of the GPS satellite (transmission source) and the GPS receiver (receiver), the movement speed of the GPS receiver is calculated using a correction coefficient of the relative speed determined by the carrier frequency (transmission frequency) of the GPS satellite signal, the reception frequency in the GPS receiver, and whether or not the reception signal is an indirect wave.

(1) Reception Signal Type Determination

For each satellite (hereinafter, referred to as "captured satellite") captured by the GPS receiver, the type of the reception signal is determined. Specifically, the type representing to which of a direct wave, an indirect wave, and a multipath signal (direct wave+indirect wave) the reception signal corresponds is determined on the basis of information, such as the signal intensity of the reception signal or an elevation angle.

When a direct wave has been received, the signal intensity of the reception signal tends to increase. On the contrary, when an indirect wave has been received, the signal intensity of the reception signal tends to decrease. Accordingly, in this embodiment, as a threshold value of the signal intensity, first threshold intensity and second threshold intensity greater than the first threshold intensity are determined. When the signal intensity exceeds the second threshold intensity, it is determined that a direct wave has been received. When the signal intensity is equal to or greater than the first threshold intensity and equal to or smaller than the second threshold intensity, it is determined that a multipath signal has been received. When the signal intensity is smaller than the first threshold intensity, it is determined that an indirect wave has been received.

The type of the reception signal may be determined from the elevation angle instead of the signal intensity. For example, a direct wave is highly likely to be received from a satellite having a high elevation angle. On the contrary, an indirect wave is highly likely to be received from a satellite having a low elevation angle. Accordingly, for example, as a threshold value of the elevation angle, a first threshold elevation angle and a second threshold elevation angle greater than the first threshold elevation angle are determined. When the elevation angle exceeds the second threshold elevation angle, it is determined that a direct wave has been received. When the elevation angle is equal to or greater than the first threshold elevation angle and equal to or smaller than the second threshold elevation angle, it is determined that a multipath signal has been received. When the elevation angle is smaller than the first threshold elevation angle, it is determined that an indirect wave has been received.

The two determination methods may be combined. For example, when the signal intensity exceeds the second threshold intensity, it is determined that a direct wave has been received. When the signal intensity is equal to or smaller than the second threshold intensity, a method of determining whether the reception signal is a multipath signal or an indirect wave by the combination of the signal intensity and the elevation angle is considered.

Of course, the method of determining the type of the reception signal using the signal intensity or the elevation angle described above is just an example, and the type of the reception signal may be determined using a different method of the related art.

(2) Selection of Movement Speed Calculating Satellite

Next, a captured satellite (hereinafter, referred to as "movement speed calculating satellite") which is used for calculating the movement speed is selected under a prescribed selection condition. In this embodiment, four parameters of the three-dimensional speed components $(u_r, v_r, w_r)$ included in the receiver speed vector $v_r$ and the clock drift d of the GPS receiver are unknown. Since there are four unknowns, it is necessary to select at least four captured satellites as the movement speed calculating satellite. In this case, for example, the movement speed calculating satellite is selected in accordance with priority determined on the basis of the type of the reception signal.

Specifically, a captured satellite in which the type of the reception signal is a direct wave has a first priority, and a captured satellite in which the type of the reception signal is an indirect wave has a second priority. A captured satellite in which the type of the reception signal is a multipath signal has a third priority.

For example, when there are four or more captured satellites having the first priority, all of these captured satellites are selected as the movement speed calculating satellite, and a captured satellite having the second or subsequent priority is not selected. When the number of captured satellites having the first priority is less than four, for example, shortfall satellites are selected from captured satellites having the second priority such that the total number of movement speed calculating satellites is equal to or greater than four. When the total number of captured satellites having the first priority and the second priority is less than four, shortfall satellites are selected from captured satellites having the third priority such that the total number of movement speed calculating satellites is equal to or greater than four. As a method of selecting shortfall satellites, shortfall satellites may be selected in a descending order of signal intensity or in a descending order of elevation angle.

(3) Movement Speed Calculation Processing

Next, processing for calculating the movement speed of the GPS receiver using the correction coefficient of the relative speed determined in accordance with the transmission frequency of the GPS satellite signal, the reception frequency in the GPS receiver, and whether or not the reception signal is an indirect wave. In the movement speed calculation processing, for example, convergence calculation is performed using a so-called least-square method which minimizes the sum of a square of the difference between an observed frequency and an estimated frequency concerning each movement speed calculating satellite. The observed frequency is the frequency of the GPS satellite signal observed by the GPS receiver, and is obtained by performing correlation computation in the frequency direction. The estimated frequency is a frequency which is estimated by Expression (13).

First, an unknown vector X with the receiver speed vector $v_r$ and the clock drift d as components is defined as Expression (14).

$$\vec{X} = \begin{bmatrix} \vec{v}_r \\ d \end{bmatrix} \quad (14)$$

At this time, convergence calculation is executed in accordance with Expressions (15) to (17).

$$\vec{X}^{(n)} = \vec{X}^{(n-1)} + \Delta \vec{X} \quad (15)$$

$$\Delta \vec{X} = (H^T H)^{-1} H^T \left( f_j - f_r(\vec{X}, \vec{v}_j, \vec{l}_j) \right) \quad (16)$$

-continued $$H = \frac{\partial f_r(\vec{X}, \vec{v}_j, \vec{l}_j)}{\partial \vec{X}} \quad (17)$$

In Expression (15), vector notation "$X^{(n)}$" represents an unknown vector which is obtained in the n-th step of convergence calculation, and "$\Delta X$" represents the amount of update of the unknown vector. The unknown vector X is updated in accordance with Expressions (15) to (17) until the amount $\Delta X$ of update of the unknown vector becomes sufficiently small.

In Expression (16), "$f_j$" is an observed frequency concerning the j-th movement speed calculating satellite, and "$f_r(X, v_j, l_j)$" is an estimated frequency estimated for the j-th movement speed calculating satellite. From Expression (13), since the reception frequency $f_r$ is represented by a function with the receiver speed vector $v_r$, the clock drift d, the satellite speed vector $v_j$, and the line-of-sight unit vector $l_j$ as variables, the estimated frequency is designated as $f_r(X,v_j,l_j)$.

Expression (13) concerning the calculation of the estimated frequency is an expression representing that an error with respect to the relative speed of the GPS satellite and the GPS receiver when the reception signal is a direct wave (it is determined that the reception signal is a direct wave) is estimated, and so to speak, the relative speed is corrected using the error.

The relative speed vector when the reception signal is a direct wave is represented by "$v_j-v_r$". Meanwhile, if the Doppler error $\epsilon$ is taken into consideration, since the effective receiver speed vector becomes "$(1-\alpha)v_r$", an error "$-\alpha\cdot v_r$" occurs. Since the error "$-\alpha\cdot v_r$" acts as a backward resistance value, in the method of calculating a movement speed of the related art, the movement speed could not be correctly calculated. That is, if the calculated movement speed is temporally integrated to obtain a movement distance, the movement distance is calculated to be shorter than the true movement distance, and as a result, a locus of a calculated position which appears to be reduced compared to a locus drawn by a true position may be obtained.

Accordingly, in the method of calculating a movement speed of this embodiment, the relative speed vector "$v_j-v_r$" is corrected after the error "$-\alpha\cdot v_r$" is estimated, thereby performing convergence calculation for obtaining the optimum resolution of the receiver speed vector $v_r$. Therefore, it becomes possible to prevent the error "$-\alpha\cdot v_r$" from acting as a backward resistance value, and to correctly calculate the movement speed. Since it can be said that "$\alpha$" is the coefficient (the correction coefficient of the relative speed) for correcting the relative speed, description will be provided while "$\alpha$" is hereinafter referred to as "correction coefficient".

The correction coefficient "$\alpha$" is the coefficient which indicates changing the relative movement direction of the GPS satellite and the GPS receiver to a given direction. Accordingly, the correction of the relative speed means the correction to the relative speed when the relative movement direction of the GPS satellite and the GPS receiver is changed to a given direction.

Returning to FIG. 3B, when the GPS receiver receives an indirect wave, this is equivalent to a situation in which the GPS receiver receives a direct wave while moving in a direction away from the GPS satellite. That is, compared to a case where the GPS receiver receives a direct wave, when the GPS receiver receives an indirect wave, the relative movement direction of the GPS satellite and the GPS receiver is changed to a given direction. Accordingly, in the correction of the relative speed, the correction to the relative speed when the relative movement direction of the GPS satellite and the GPS receiver is changed to a given direction is done.

In the convergence calculation of Expressions (15) to (17), different correction coefficients $\alpha$ are applied depending on the type (direct wave, indirect wave, or multipath signal) of the reception signal measured for each movement speed calculating satellite to calculate the estimated frequency $f_r(X,v_j,l_j)$ from Expression (13). That is, calculation for calculating the movement speed of the GPS receiver while changing the value of the correction coefficient depending on the type of the reception signal is performed.

According to the experiment performed by the inventors, it has been confirmed that the correction coefficient $\alpha$ when the reception signal is an indirect wave is equal to or greater than 1.0 and equal to or smaller than 3.0, and preferably, equal to or greater than 1.8 and equal to or smaller than 2.2, and the movement speed is calculated, thereby obtaining the movement speed of the GPS receiver with high accuracy. Accordingly, for a movement speed calculating satellite in which the type of the reception signal is an indirect wave, for example, the estimated frequency $f_r(X,v_j,l_j)$ is calculated with the correction coefficient "$\alpha=2.0$".

For a movement speed calculating satellite in which the type of the reception signal is a direct wave, for example, the estimated frequency $f_r(X,v_j,l_j)$ is calculated with the correction coefficient "$\alpha=0$". For a movement speed calculating satellite in which the type of the reception signal is a multipath signal, for example, the estimated frequency $f_r(X,v_j,l_j)$ is calculated with the correction coefficient "$\alpha=1.0$".

2. Example

Next, an example of a movement speed calculation device which calculates the movement speed under the above principle will be described. In this example, as an example of an electronic apparatus including a movement speed calculation device, an example of a mobile phone (including a smart phone) will be described.

2-1. Configuration of Mobile Phone

Figure 4:
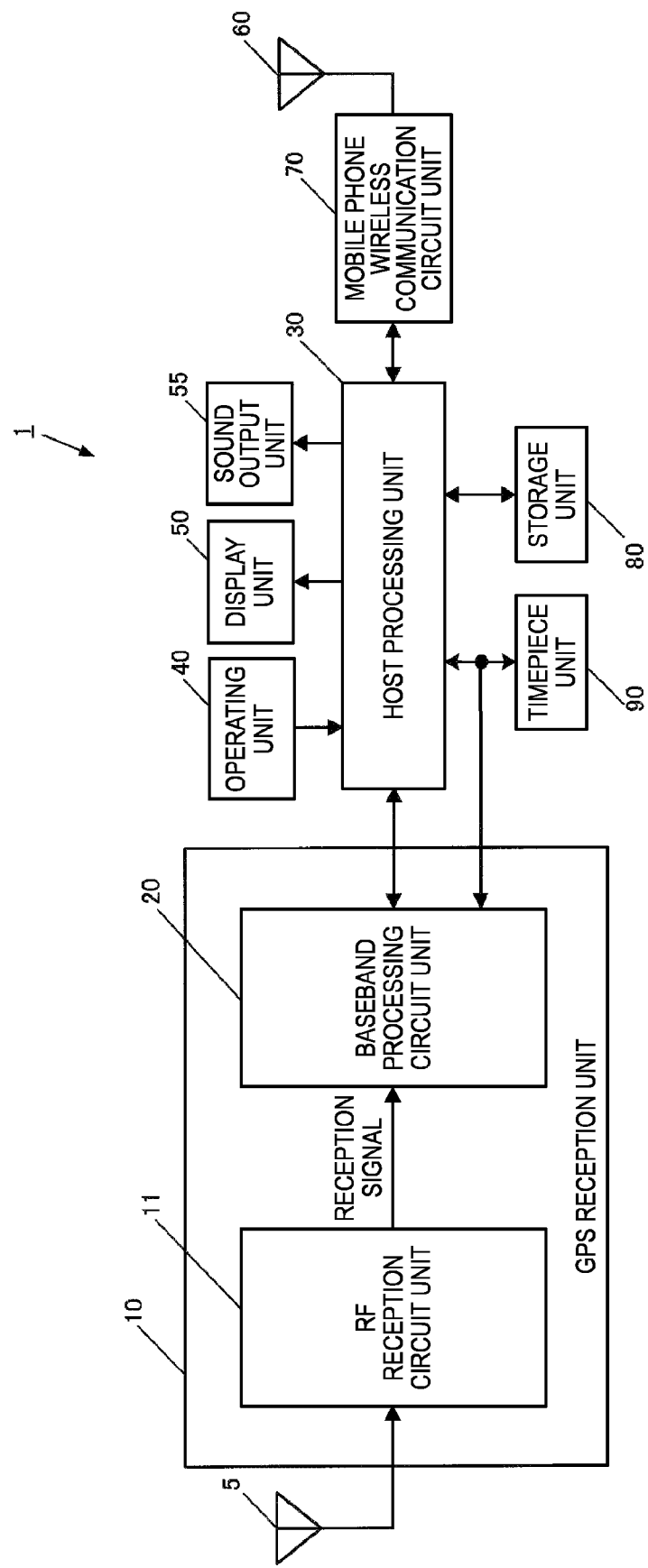
FIG. 4 is a diagram showing an example of the functional configuration of a mobile phone.

FIG. 4 is a block diagram showing an example of the functional configuration of a mobile phone 1 in this example. The mobile phone 1 includes a GPS antenna 5, a GPS reception unit 10, a host processing unit 30, an operating unit 40, a display unit 50, a sound output unit 55, a mobile phone antenna 60, a mobile phone wireless communication circuit unit 70, a storage unit 80, and a timepiece unit 90.

The GPS antenna 5 is an antenna which receives RF (Radio Frequency) signals including GPS satellite signals sent from GPS satellites, and outputs reception signals to the GPS reception unit 10.

The GPS reception unit 10 is a circuit or a device which calculates the position or speed of the mobile phone 1 (GPS receiver) on the basis of the reception signal of the GPS satellite signal received by the GPS antenna 5, and is a functional block corresponding to a so-called GPS receiver. In this embodiment, the GPS reception unit 10 corresponds to a movement speed calculation device.

The GPS reception unit 10 includes an RF reception circuit unit 11 and a baseband processing circuit unit 20. The RF reception circuit unit 11 and the baseband processing circuit unit 20 may be manufactured as separate LSI (Large Scale Integration) or may be manufactured as one chip.

The RF reception circuit unit 11 is a reception circuit of RF signals, and corresponds to a reception unit which receives a transmission signal from a GPS satellite as a predetermined transmission source. As a circuit configuration, for example, a reception circuit in which an RF signal output from the GPS antenna 5 is converted to a digital signal by an A/D converter, and the digital signal is processed may be provided. A configuration in which signal processing is performed on an RF signal output from the GPS antenna 5 as an analog signal, and after A/D conversion, a digital signal is finally output to the baseband processing circuit unit 20 may be provided.

In the latter case, for example, the RF reception circuit unit 11 may be configured as follows. That is, a predetermined oscillation signal is divided or multiplied to generate an oscillation signal for RF signal multiplication. The generated oscillation signal is multiplied to the RF signal output from the GPS antenna 5 to down-convert the RF signal to an intermediate-frequency signal (hereinafter, referred to as "IF (Intermediate Frequency) signal"), and the IF signal is amplified or the like, converted to a digital signal by the A/D converter, and output to the baseband processing circuit unit 20.

The baseband processing circuit unit 20 is a circuit unit which captures the GPS satellite signal sent from the GPS satellite on the basis of the reception signal output from the RF reception circuit unit 11. Specifically, the baseband processing circuit unit 20 executes carrier removal, correlation computation, or the like on the reception signal by hardware using a dedicated circuit or by software as digital signal processing to capture the GPS satellite signal. The position or movement speed is calculated using measurement information concerning the captured GPS satellite signal.

In this example, description will be provided assuming that the baseband processing circuit unit 20 calculates the movement speed of the mobile phone 1 (GPS receiver) using the frequency after being down-converted to an intermediate frequency by the RF reception circuit unit 11. That is, Expression (13) described in the principle is applied as a calculation formula of the estimated frequency in the band of the intermediate frequency, and the movement speed of the mobile phone 1 is calculated in accordance with Expressions (14) to (17) using the frequency after being down-converted by the RF reception circuit unit 11.

The host processing unit 30 is a processor which performs overall control of the respective units of the mobile phone 1 in accordance with various programs, such as a system program stored in the storage unit 80, and has a processor, such as a CPU (Central Processing Unit). The host processing unit 30 causes the display unit 50 to display a map indicating the current position on the basis of information of the position or speed input from the baseband processing circuit unit 20, or uses information of the position or speed for various kinds of application processing.

The operating unit 40 is, for example, an input device having a touch panel, a button switch, or the like, and outputs a signal of a depressed key or button to the host processing unit 30. With the operation of the operating unit 40, the input of various instructions, such as a call request, a mail transmission/reception request, a request to execute various applications, a position calculation request, and a speed calculation request, is made.

The display unit 50 is a display device having an LCD (Liquid Crystal Display) or the like, and performs various kinds of display based on a display signal output from the host processing unit 30. The calculation result of the position and speed, time information, or the like is displayed on the display unit 50.

The sound output unit 55 is a sound output device having a speaker, and outputs various kinds of sound based on a sound output signal output from the host processing unit 30. Sound, such as voice during a call or sound concerning various applications, is output from the sound output unit 55.

The mobile phone antenna 60 is an antenna which performs transmission/reception of a mobile phone radio signal with a wireless base station provided by a communication service provider of the mobile phone 1.

The mobile phone wireless communication circuit unit 70 is a communication circuit unit of the mobile phone which has an RF conversion circuit, a baseband processing circuit, and the like, and performs modulation and demodulation of the mobile phone radio signal, thereby realizing transmission/reception of a call or a mail, or the like.

The storage unit 80 has a storage device, such as a ROM (Read Only Memory), a flash ROM, or a RAM (Random Access Memory), and stores a system program used when the host processing unit 30 controls the mobile phone 1, or various programs or data for executing various kinds of application processing.

The timepiece unit 90 is an internal timepiece of the mobile phone 1, and has a crystal oscillator having a crystal vibrator and an oscillation circuit, or the like. The clocking time of the timepiece unit 90 is output to the baseband processing circuit unit 20 and the host processing unit 30 at any time. The clocking time of the timepiece unit 90 is corrected on the basis of a clock bias (timepiece error) calculated by the baseband processing circuit unit 20.

2-2. Configuration of Baseband Processing Circuit Unit

Figure 5:
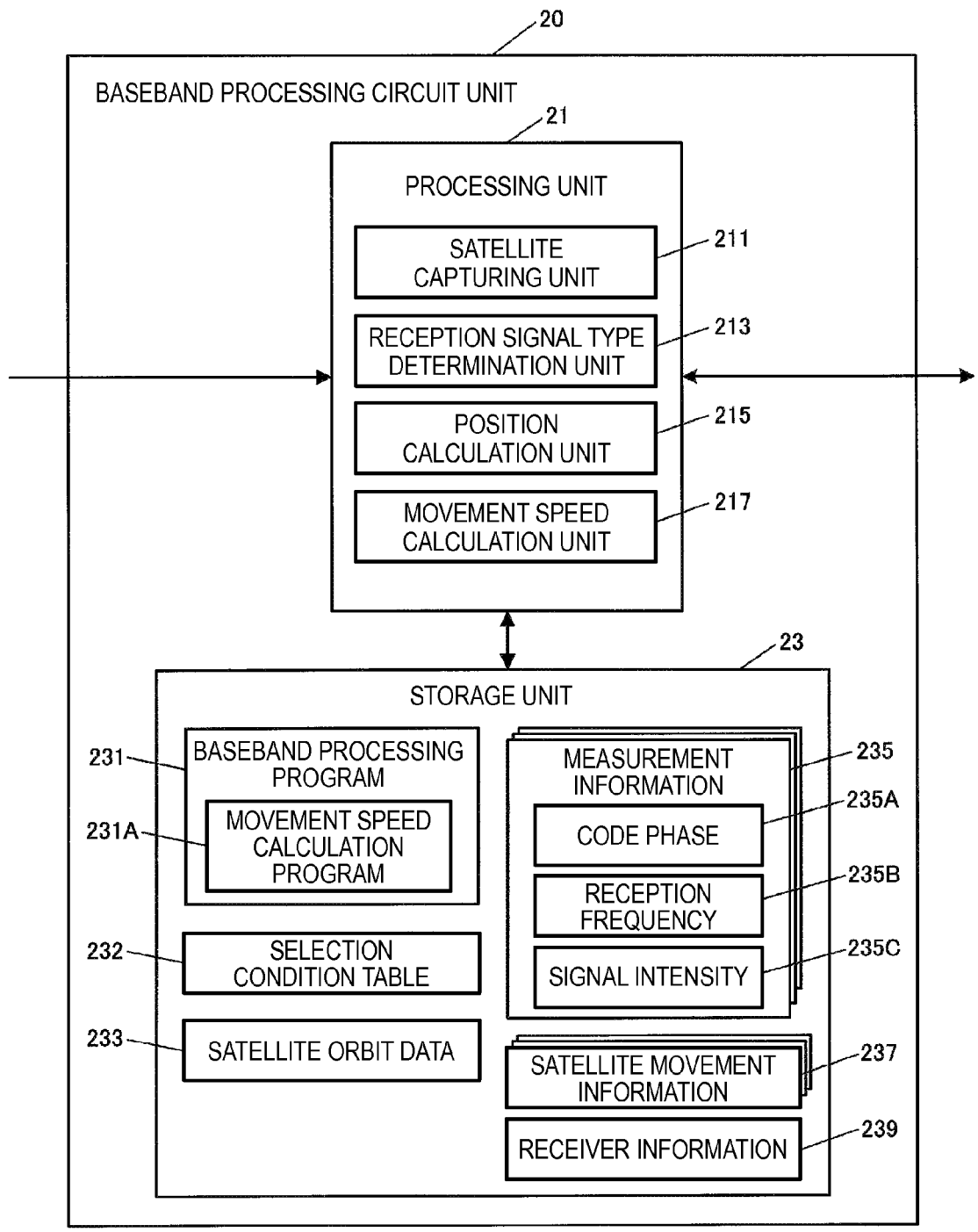
FIG. 5 is a diagram showing an example of the circuit configuration of a baseband processing circuit unit.

FIG. 5 is a diagram showing an example of the circuit configuration of the baseband processing circuit unit 20 and the data configuration of the storage unit 23, and is a diagram focusing on a circuit block involved in this example. The baseband processing circuit unit 20 includes, as a main part, a processing unit 21 and a storage unit 23. In this example, the baseband processing circuit unit 20 realizes capturing of a GPS satellite signal by software as digital signal processing.

The processing unit 21 is a control device and arithmetic device which performs overall control of the functional units of the baseband processing circuit unit 20, and has a processor, such as a CPU or a DSP (Digital Signal Processor).

The processing unit 21 has a satellite capturing unit 211, a reception signal type determination unit 213, a position calculation unit 215, and a movement speed calculation unit 217. Meanwhile, when applying the invention, all of the functional units may not be essential components, and other functional units may be essential components.

The satellite capturing unit 211 is a functional unit which captures a GPS satellite (GPS satellite signal). Specifically, digital signal processing, such as carrier removal or correlation computation, is executed on the digitized reception signal output from the RF reception circuit unit 11 to capture a GPS satellite. Peak determination is performed for the correlation computation result in the phase direction and the frequency direction, and various kinds of amount, such as the code phase or the reception frequency of the reception signal or the signal intensity is calculated as measurement information.

The reception signal type determination unit 213 determines the type of the reception signal in accordance with the reception signal type determination method described in the principle. The reception signal type determination unit 213 corresponds to a determination unit which determines whether or not the reception signal of the reception unit is an indirect wave.

The position calculation unit 215 performs the known position calculation of the related art using a code phase 235A included in measurement information 235 concerning each captured satellite captured by the satellite capturing unit 211 or satellite movement information 237 to calculate the receiver position and the clock bias.

The movement speed calculation unit 217 calculates the receiver speed vector or clock drift using a reception frequency 235B included in the measurement information 235 concerning each captured satellite captured by the satellite capturing unit 211 or the satellite movement information 237 in accordance with the movement speed calculation method described in the principle. The movement speed calculation unit 217 corresponds to a calculation unit which calculates the movement speed of the GPS reception unit 10.

The storage unit 23 stores a system program of the baseband processing circuit unit 20, various programs for realizing a satellite capturing function, a reception signal type determination function, a position calculation function, and a movement speed calculation function, data, and the like. The storage unit 23 has a work area which temporarily stores in-processing data, processing results, and the like of various kinds of processing.

Figure 6:
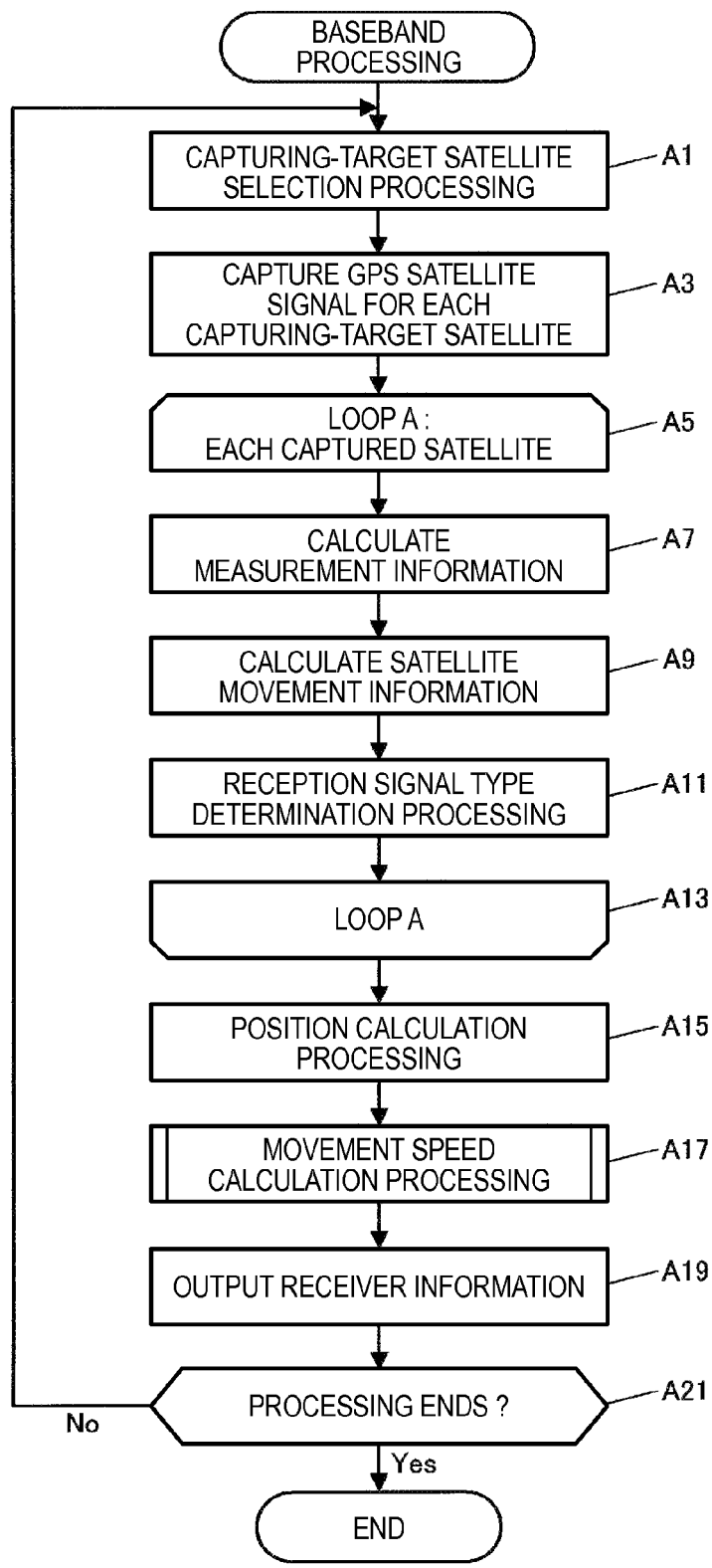
FIG. 6 is a flowchart showing the flow of baseband processing.

The storage unit 23 stores a baseband processing program 231 which is read by the processing unit 21 and executed as baseband processing (see FIG. 6). The baseband processing program 231 includes a movement speed calculation program 231A, which is executed as movement speed calculation processing (see FIG. 7), as a subroutine. These kinds of processing will be described in detail with reference to flowcharts.

The storage unit 23 stores a selection condition table 232, satellite orbit data 233, measurement information 235 concerning each captured satellite, satellite movement information 237 concerning each captured satellite, and receiver information 239.

The selection condition table 232 is a table in which a selection condition to be used when the movement speed calculation unit 217 selects a movement speed calculating satellite from among captured satellites is determined.

The satellite orbit data 233 is data, such as almanac or ephemeris of each GPS satellite. The satellite orbit data 233 is acquired by decoding the GPS satellite signal received from the GPS satellite, and acquired as assist data from the base station of the mobile phone 1 or an assist server.

The measurement information 235 is the amount concerning the captured GPS satellite signal, and includes the code phase 235A, the reception frequency 235B, and signal intensity 235C.

The satellite movement information 237 is information representing the movement state of the captured satellite, and includes, for example, the satellite position or the satellite speed vector.

The receiver information 239 is information concerning the GPS receiver, and includes, for example, the calculation results of the receiver position, the clock bias, the receiver speed vector, and the clock drift.

2-3. Flow of Processing

FIG. 6 is a flowchart showing the flow of baseband processing which is executed in the baseband processing circuit unit 20 when the baseband processing program 231 stored in the storage unit 23 is read by the processing unit 21.

Initially, the processing unit 21 performs capturing-target satellite selection processing (Step A1). Specifically, a GPS satellite in the sky at the current time clocked by the timepiece unit 90 is determined using the satellite orbit data 233 stored in the storage unit 23 and selected as a capturing-target satellite.

Next, the satellite capturing unit 211 captures the GPS satellite signal for each capturing-target satellite (Step A3). Specifically, digital signal processing, such as carrier removal or correlation computation, is executed on the reception signal input from the RF reception circuit unit 11 to capture the GPS satellite signal. The processing unit 21 executes processing of a loop A for each captured satellite correlated by correlation computation (Steps A5 to A13).

In the processing of the loop A, the processing unit 21 calculates the measurement information 235 concerning the captured satellite (Step A7). Specifically, the code phase 235A and the reception frequency 235B are determined from the correlation peak value obtained by correlation computation in the phase direction and the frequency direction. The signal intensity 235C is calculated using the IQ components of the correlation peak value.

Next, the processing unit 21 calculates the satellite position and the satellite speed vector of the captured satellite as the satellite movement information 237 using the satellite orbit data 233 obtained by decoding the GPS satellite signal captured for the captured satellite (Step A9).

Thereafter, the reception signal type determination unit 213 performs reception signal type determination processing for determining the type of the signal received from the captured satellite (Step A11). The processing content of the reception signal type determination processing is as described above. The processing unit 21 progresses the processing to the next captured satellite. If the processing of Steps A7 to A11 has been performed for all of the captured satellites, the processing of the loop A ends (Step A13).

Next, the position calculation unit 215 performs position calculation processing (Step A15). Specifically, a pseudo distance is calculated using the code phase 235A included in the measurement information 235 calculated in Step A7 for each captured satellite, and predetermined position calculation using the pseudo distance is performed to calculate the receiver position and the clock bias. The calculation results are stored in the storage unit 23 as the receiver information 239.

Next, the movement speed calculation unit 217 performs movement speed calculation processing in accordance with the movement speed calculation program 231A stored in the storage unit 23 (Step A17).

Figure 7:
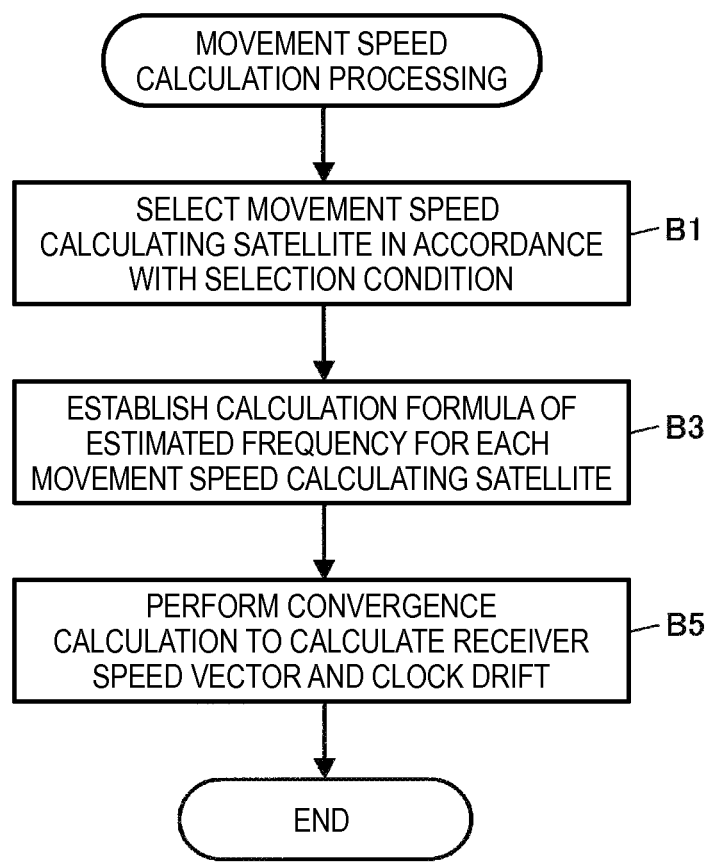
FIG. 7 is a flowchart showing the flow of movement speed calculation processing.

FIG. 7 is a flowchart showing the flow of movement speed calculation processing.

Initially, the movement speed calculation unit 217 selects the movement speed calculating satellite from among the captured satellites in accordance with the selection condition determined in the selection condition table 232 of the storage unit 23 (Step B1). The movement speed calculation unit 217 establishes the calculation formula of the estimated frequency represented by Expression (13) for each selected movement speed calculating satellite (Step B3).

The movement speed calculation unit 217 performs convergence calculation in accordance with Expressions (15) to (17) using the calculation formula of the estimated frequency established for each movement speed calculating satellite to calculate the receiver speed vector and the clock drift (Step B5). The movement speed calculation unit 217 stores the calculated receiver speed vector and clock drift in the storage unit 23 as the receiver information 239, and then ends the movement speed calculation processing.

Returning to the baseband processing of FIG. 6, after the movement speed calculation processing is performed, the processing unit 21 outputs the receiver information 239 including the receiver position and the clock bias obtained in the position calculation processing and the receiver speed vector and the clock drift obtained in the movement speed calculation processing to the host processing unit 30 (Step A19).

Thereafter, the processing unit 21 determines whether or not to end the processing (Step A21), and when it is determined to continue the processing (Step A21; No), returns to Step A1. When it is determined to end the processing (Step A21; Yes), the baseband processing ends.

3. Functional Effect

According to this embodiment, it is determined whether or not the reception signal of the GPS receiver is an indirect wave. Under the principle that the reception frequency changes depending on the relative speed of the GPS satellite and the GPS receiver, the movement speed of the GPS receiver is calculated using the correction coefficient of the relative speed determined in accordance with the transmission frequency of the GPS satellite signal, the reception frequency in the GPS receiver, and whether or not the reception signal is an indirect wave. When the reception signal from the GPS satellite is an indirect wave, the correction coefficient for indirect wave reception is applied as the correction coefficient of the relative speed of the GPS satellite and the GPS receiver, and under the principle that the reception frequency changes depending on the relative speed is used, the movement speed of the GPS receiver can be correctly calculated.

In the movement speed calculation processing, the error with respect to the relative speed when the reception signal is a direct wave is estimated assuming that the movement speed of the GPS receiver and the error have a positive correlation. Specifically, the error with respect to the relative speed is estimated in accordance with a linear correlation formula (linear function) in which the correction coefficient "α" representing the degree of increase of the error with respect to the movement speed of the GPS receiver is equal to or greater than 1.0 and equal to or smaller than 3.0. Therefore, it is possible to correctly estimate the error with respect to the relative speed when the reception signal is a direct wave and to appropriately correct the relative speed.

Even when the GPS receiver receives an indirect wave, for example, even when the GPS receiver is moving in a direction close to the GPS satellite, it appears that the GPS receiver is moving in a direction away from the GPS satellite from the effect of the Doppler error. Accordingly, the relative speed when the reception signal is a direct wave is corrected to the relative speed when the relative movement direction of the GPS satellite and the GPS receiver is changed to a given direction, thereby preventing the movement speed from being erroneously calculated.

4. Modifications

An example to which the invention can be applied is not limited to the foregoing example, and may be of course appropriately changed without departing from the scope of the invention. Hereinafter, modifications will be described.

4-1. Transmission Source

Although in the foregoing embodiment, a case where a predetermined transmission source is a GPS satellite has been described, the predetermined transmission source is not limited thereto. For example, a positioning satellite in a satellite positioning system, such as WAAS (Wide Area Augmentation System), QZSS (Quasi Zenith Satellite System), GLONASS (GLObal NAvigation Satellite System), or GALILEO, as a satellite positioning system other than the GPS, may be a transmission source.

As a positioning satellite which simulates a positioning satellite, a pseudo satellite (pseudolite) provided on the ground is known. The pseudo satellite may be a predetermined transmission source, a pseudo satellite signal transmitted from the pseudo satellite may be received to calculate the movement speed of the receiver by the same method as in the foregoing embodiment. The base station of the mobile phone may be a predetermined transmission source, and a base station signal transmitted from the base station may be received to calculate the movement speed of the receiver.

4-2. Calculation of Movement Speed

Although in the foregoing embodiment, a case where the speed of the GPS receiver is considered as a three-dimensional speed vector, and four unknowns including the clock drift are obtained has been described, this is just an example. For example, the value of the clock drift may be known, and three unknowns concerning a three-dimensional speed vector may be obtained. In this case, three or more captured satellites may be selected as a movement speed calculating satellite.

Instead of considering a three-dimensional speed vector, a two-dimensional speed vector or a one-dimensional speed vector may be considered. For example, when a four-wheeled vehicle is considered, it can be assumed that the four-wheeled vehicle does not jump or skid during normal driving. In this case, the speed components of the up-down direction and the left-right direction with respect to the four-wheeled vehicle may be zero, and only one-dimensional speed with respect to the forth-back direction of the four-wheeled vehicle may be considered. In this case, if the clock drift is known, the movement speed of the receiver can be calculated only by capturing one GPS satellite.

4-3. Method of Selecting Movement Speed Calculating Satellite

The method of selecting a movement speed calculating satellite described in the foregoing embodiment is just an example, and may be of course appropriately changed. For example, a captured satellite in which it is determined that the reception signal is a multipath signal may not be selected as a movement speed calculating satellite, and all captured satellites in which it is determined that the reception signal is a direct wave and all captured satellites in which it is determined that the reception signal is an indirect wave may be selected as a movement speed calculating satellite.

4-4. Correction Coefficient

Although in the foregoing embodiment, the correction coefficient when the reception signal is an indirect wave is "α=2.0", the correction coefficient when the reception signal is a direct wave is "α=0", and the correction coefficient when the reception signal is a multipath signal is "α=1.0", these values are just an example.

The correction coefficient α when the reception signal is an indirect wave is preferably equal to or greater than 1.0 and equal to or smaller than 3.0, and more preferably, equal to or greater than 1.8 and equal to or smaller than 2.2. Meanwhile, when the relationship between the line-of-sight receiver speed $v_{rad}$ and the Doppler error ε is approximated by a function other than a linear expression, since the meaning of α differs, different values may be taken.

The correction coefficient α when the reception signal is a direct wave may not be zero and may have a given margin around zero, and for example, the correction coefficient α may be selected from a numerical value range equal to or greater than −0.2 and equal to or smaller than +0.2.

4-5. Determination of Output Position

The final output position may be determined using the receiver position calculated on the basis of the pseudo distance and the receiver position calculated by integrating the receiver speed vector.

Figure 8:
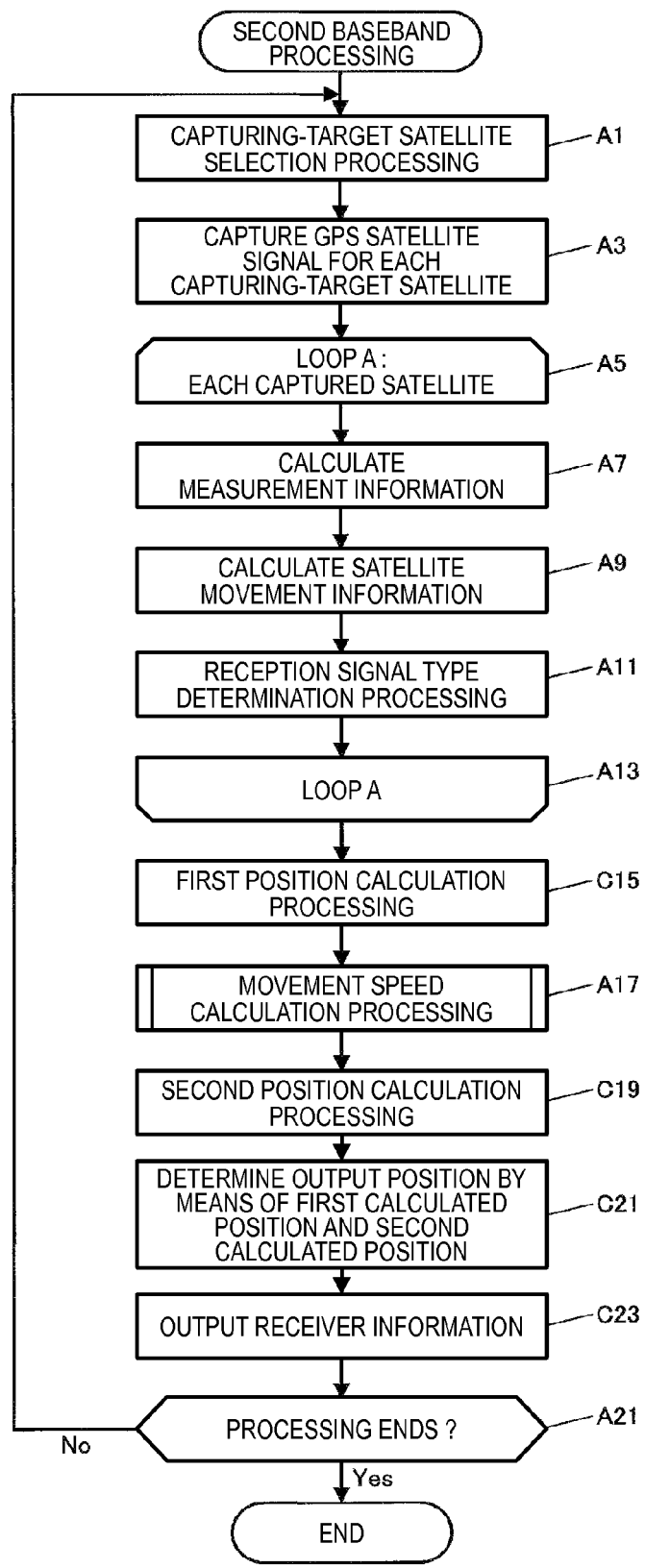
FIG. 8 is a flowchart showing the flow of second baseband processing.

FIG. 8 is a flowchart showing the flow of second baseband processing which is executed by the processing unit 21 of the baseband processing circuit unit 20 instead of the baseband processing of FIG. 6. The same steps as in the baseband processing are represented by the same reference numerals, and further description will be omitted.

After the processing of the loop A, the position calculation unit 215 performs first position calculation processing (Step C15). In the first position calculation processing, convergence calculation is performed on the basis of the pseudo distance calculated for each captured satellite to calculate the receiver position and the clock bias. The receiver position calculated in the first position calculation processing is stored as a first calculated position.

After the movement speed calculation processing is performed in Step A17, the position calculation unit 215 performs second position calculation processing (Step C19). In the second position calculation processing, the movement distance and the movement direction of the GPS receiver are calculated by integrating the receiver speed vector obtained in the movement speed calculation processing, and added to the previously obtained receiver position to calculate the current receiver position. The receiver position calculated in the second position calculation processing is stored as a second calculated position.

Next, the position calculation unit 215 determines the output position using the first calculated position obtained through the first position calculation processing and the second calculated position obtained through the second position calculation processing (Step C21). For example, average processing of the first calculated position and the second calculated position is performed, and the resultant position is determined as the output position. In this case, as the average processing, a simple arithmetic average may be applied or a weighted average may be applied. The processing unit 21 outputs the receiver information 239 including the determined output position to the host processing unit 30 (Step C23).

4-6. Frequency for Movement Speed Calculation

Although in the foregoing example, a case where the GPS receiver embedded in the electronic apparatus calculates the movement speed using the frequency after being down-converted to the intermediate frequency has been described. Meanwhile, the calculation formula of the estimated frequency of Expression (13) may be substantially similarly applied to a frequency in a certain band before and after down-conversion. For this reason, a configuration in which the GPS receiver calculates the movement speed using a frequency before down-conversion may be of course provided.

4-7. Electronic Apparatus

Although in the foregoing example, an example where the invention is applied to a mobile phone as a type of electronic apparatus has been described, an electronic apparatus to which the invention can be applied is not limited thereto. For example, the invention can be similarly applied to other electronic apparatuses, such as a car navigation device, a portable navigation device, a personal computer, a PDA (Personal Digital Assistant), and a wristwatch. The invention may be applied as a speedometer which measures the speed of an automobile, a motor bicycle, or a bicycle as a mobile object.

4-8. Subject of Processing

Although in the foregoing example, a case where the movement speed calculation processing is executed by the processing unit of the baseband processing circuit unit has been described, the host processing unit of the electronic apparatus may execute the movement speed calculation processing. The baseband processing circuit unit and the host processing unit may distribute processing such that the position calculation processing is executed by the processing unit of the baseband processing circuit unit, and the movement speed calculation processing is executed by the host processing unit of the electronic apparatus.

What is claimed is:

1. A method for calculating a movement speed of a receiver receiving a transmission signal from a predetermined transmission source, the method comprising:
    determining whether a reception signal of the receiver is an indirect wave, a direct wave, or a multipath signal; and
    based on a principle that a reception frequency changes depending on a relative speed of the transmission source and the receiver, calculating the movement speed of the receiver using a correction coefficient of the relative speed, a transmission frequency of the transmission signal at the transmission source and the reception frequency in the receiver,
    wherein the correction coefficient has a first value when the reception signal is determined to be a direct wave, the correction coefficient has a second value when the reception signal is determined to be a multipath wave, and the correction coefficient has a third value when the reception signal is determined to be an indirect wave.

2. The method according to claim 1,
    wherein the calculating of the movement speed includes estimating an error with respect to the relative speed when it is determined that the reception signal is a direct wave.

3. The method according to claim 2,
    wherein the estimating of the error includes estimating the error assuming that the movement speed of the receiver and the error have a positive correlation.

4. The method according to claim 3,
    wherein the estimating of the error includes estimating the error based on the positive correlation in which the degree of increase of the error with respect to the movement speed of the receiver is equal to or greater than 1.0 and equal to or smaller than 3.0.

5. The method according to claim 1,
    wherein the correction coefficient is a coefficient which indicates changing a relative movement direction of the transmission source and the receiver to a given direction.

6. The method according to claim 1, further comprising:
    receiving transmission signals from a plurality of transmission sources,
    wherein the determining includes determining whether or not each reception signal is an indirect wave, and
    the calculating of the movement speed includes calculating the movement speed of the receiver using a correction coefficient of a relative speed concerning each reception signal.

7. The method of claim 1, wherein the first value of the correction coefficient is zero when the reception signal is determined to be a direct wave.

8. The method of claim 1, wherein the second value of the correction coefficient is one when the reception signal is determined to be a multipath signal.

9. The method of claim 1, wherein the third value of the correction coefficient is two when the reception signal is determined to be an indirect wave.

10. A device for calculating a movement speed, the device comprising:
    a reception unit which receives a transmission signal from a predetermined transmission source;
    a determination unit which determines whether a reception signal of the reception unit is an indirect wave, a direct wave, or a multipath signal; and a calculation unit which, based on a principle that a reception frequency changes depending on a relative speed of the transmission source and the reception unit, calculates the movement speed of the reception unit using a correction coefficient of the relative speed, a transmission frequency of the transmission signal at the transmission source and the reception frequency in the reception unit, wherein the correction coefficient has a first value when the reception signal is determined to be a direct wave, the correction coefficient has a second value when the reception signal is determined to be a multipath wave, and the correction coefficient has a third value when the reception signal is determined to be an indirect wave.

\* \* \* \* \*